(12) United States Patent
Stone et al.

(10) Patent No.: US 12,549,658 B2
(45) Date of Patent: Feb. 10, 2026

(54) METHOD AND APPARATUS FOR PROVIDING NETWORK EXPERIENCE TESTING

(71) Applicant: SMARTSKY NETWORKS LLC, Morrisville, NC (US)

(72) Inventors: Ryan Stone, Charlotte, NC (US); Brian Rudloff, Sattelite Beach, FL (US); Blane Rockafellow, Raleigh, NC (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 296 days.

(21) Appl. No.: 17/431,283

(22) PCT Filed: Feb. 19, 2020

(86) PCT No.: PCT/US2020/018728
§ 371 (c)(1),
(2) Date: Aug. 16, 2021

(87) PCT Pub. No.: WO2020/172209
PCT Pub. Date: Aug. 27, 2020

(65) Prior Publication Data
US 2022/0131782 A1    Apr. 28, 2022

Related U.S. Application Data

(60) Provisional application No. 62/807,325, filed on Feb. 19, 2019.

(51) Int. Cl.
*H04M 1/24* (2006.01)
*H04L 43/04* (2022.01)
(Continued)

(52) U.S. Cl.
CPC .............. *H04M 1/24* (2013.01); *H04L 43/04* (2013.01); *H04L 43/06* (2013.01); *H04L 43/10* (2013.01);
(Continued)

(58) Field of Classification Search
CPC ......... H04L 43/50; H04L 43/04; H04L 43/06; H04L 43/10; H04W 24/06; H04W 24/08
(Continued)

(56) References Cited

U.S. PATENT DOCUMENTS 7,346,678 B1 * 3/2008 Zhu ..................... G06F 11/3495
709/224
2005/0240799 A1 * 10/2005 Manfredi ............ H04L 41/5096
714/4.1
(Continued)

OTHER PUBLICATIONS

International Search Report and Written Opinion from related international application PCT/US2020/018728, mailed on May 5, 2020, all pages cited in its entirety.

*Primary Examiner* — Hermon Asres
(74) *Attorney, Agent, or Firm* — Burr & Forman (57) ABSTRACT

A method of obtaining qualitative information regarding network capabilities includes determining network identification information for an access network of a user responsive to receipt of a request from a user device to detect the access network of the user, determining network parameters for the access network, performing one or more additional network tests specific to categories of services or applications to obtain a qualitative assessment of the access network's capabilities relative to different categories of services or applications, and/or providing a graphical display of the qualitative assessment on the user device.

21 Claims, 6 Drawing Sheets

(51) Int. Cl.
*H04L 43/06* (2022.01)
*H04L 43/08* (2022.01)
*H04L 43/10* (2022.01)
*H04L 43/50* (2022.01)
*H04W 24/06* (2009.01)
*H04W 24/08* (2009.01)

(52) U.S. Cl.
CPC ............. *H04L 43/50* (2013.01); *H04W 24/06* (2013.01); *H04W 24/08* (2013.01); *H04L 43/08* (2013.01)

(58) Field of Classification Search
USPC .......................................................... 709/224
See application file for complete search history.

(56) References Cited

U.S. PATENT DOCUMENTS

2013/0166731 A1* 6/2013 Yamanaka .............. H04L 67/61
709/224
2015/0103685 A1 4/2015 Butchko et al.
2016/0373944 A1* 12/2016 Jain .................... H04L 41/5032

\* cited by examiner

METHOD AND APPARATUS FOR PROVIDING NETWORK EXPERIENCE TESTING

CROSS-REFERENCE TO RELATED APPLICATIONS

This application claims priority to U.S. application No. 62/807,325 filed on Feb. 19, 2019, the entire contents of which are hereby incorporated by reference in its entirety.

TECHNICAL FIELD

Example embodiments generally relate to communication network testing and, more particularly, relate to a system for evaluating network performance across a variety of potential use case scenarios, and providing users, or applications themselves, with an indication of how the user is likely to experience the networks, or how an application should adapt to the quality of the experienced connection, based on the performance metrics.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility. However, in spite of the familiarity that people have with remaining continuously connected to networks, people have become equally familiar with the realization that all networks are not created equal in terms of their ability to provide a satisfying user experience.

For example, in certain buildings (e.g., hotels, conference centers, etc.), on airplanes, or in many other contexts, including user's own home networks, slow downloads, latency, disconnections, or various other interruptions or impediments may be experienced. In some cases, although network operators claim high bandwidth and speed capabilities for their networks, the user experience does not match or validate those claims. The disconnect between claimed performance and user experience can sometimes be explained by the fact that all users of a particular network share a given amount of bandwidth. Meanwhile, other networks may have large amounts of bandwidth to offer customers, but poor latency nevertheless ruins the user experience for applications that require a real time interaction of any kind or where high latency or slow return links (especially when compared to a fast forward link from the internet to the device) creates a queuing effect, caused by slow TCP acknowledgements, retransmissions, etc.

Although certain network testing capabilities are known and already employed in various contexts, the testing often requires specific applications, hardware, or software to be involved, or the testing cannot be accomplished. Meanwhile, in other cases, the test results are completely irrelevant to the actual experience of the user or the performance of applications which need a more reliable connection than what a traditional speed test might indicate. Many applications presume that a connection via Wi-Fi is fast, not taking into account that there may be significant imbalance of forward and return link capabilities, along with latency or jitter induced performance impacts, which can drastically reduce the experienced capability as compared to the theoretical expectation established by speed test results when taken in isolation. Accordingly, it would be desirable to provide a network testing capability that is robust enough to test parameters alone and in combination that are relevant to numerous types of services, and also provides meaningful feedback to users and applications that accurately reflects the experience they can expect to have when using the network. Thus, applications might run in different modes based on the quality of the connection and provide for an optimal user experience in light of measurements better reflective of the real network quality.

BRIEF SUMMARY OF SOME EXAMPLES

In one example embodiment, a method of obtaining qualitative information regarding network capabilities is provided. The method may include determining network identification information for an access network of a user responsive to receipt of a request from a user device to detect the access network of the user, determining network parameters for the access network, performing one or more additional network tests specific to categories of services or applications to obtain a qualitative assessment of the access network relative to different categories of services or applications, and providing a graphical display of the qualitative assessment on the user device.

In another example embodiment, an experience tester including a test module is provided. The test module may be configured to determine network identification information for an access network of a user responsive to receipt of a request from a user device to detect the access network of the user, determine network parameters for the access network, perform one or more additional network tests specific to categories of services or applications to obtain a qualitative assessment of the access network relative to different categories of services or applications, and provide a graphical display of the qualitative assessment on the user device.

In another example embodiment, a method of utilizing experience testing information for web service or application improvement is provided. The method may include requesting, from a web service or application, execution of an experience test on an access network associated with an automated script or by the user launching the web service or application, and receiving results of the experience test indicating a qualitative assessment of the access network relative to different categories of services or applications, which can be used, in whole or in part, to then inform applications in order for the application to better adapt to the real network conditions, rather than merely viewing connectivity as on or off, but instead using a qualification of the performance or performance degradation to run in different modes other than just online or offline. The method may further include providing, based on a category of the web service or application and the results of the experience test, an indication to the user regarding quality of experience likely to be encountered by the user.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used in herein, the terms "component," "module," "system," "device" and the like are intended to include a computer-related entity, such as but not limited to hardware, firmware, a combination of hardware and software, or software in execution on some sort of hardware. For example, a component may be, but is not limited to being, a process running on a processor, a processor, an object, an executable, a thread of execution, a program, and/or a computer. By way of example, both an application running on a computing device and/or the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

As mentioned above, some example embodiments may provide a network test device or "experience tester" that is configured to not only conduct a battery of network capability tests, but to do so without requiring any local hardware or software to be installed at the device initiating the testing. Moreover, in some embodiments, the experience tester further, as the name implies, provides a useful indicator to the operator regarding how the user will experience the network for each of a plurality of different types of services for which the network may be used. The indicator may therefore be thought of as a qualitative assessment of the network's capabilities with respect to each category or type of service. From a practical perspective, the experience tester may be used to provide a comprehensive indication of network capabilities, but also let a user who plans to use a web service or application of a particular type or category whether or not the access network the user is currently on will provide a good experience to the user for the web service or application in question. The user can therefore be equipped to make decisions about whether the currently available access network is suitable to any web applications or services the user plans to utilize. Moreover, as will be discussed in greater detail below, even applications or services may find the experience tester to be useful in selecting modes of operation for working with the user based on the capabilities of the user's access network. Finally, through the collection of many experience tests over time, which might be centralized or accomplished in the cloud, statistically significant, relative network comparisons can be enabled to more objectively compare connectivity, whether the network is wired or wireless or a combination, even in the absence of the test itself but by virtue of merely knowing which network is being primarily used.

Figure 1:
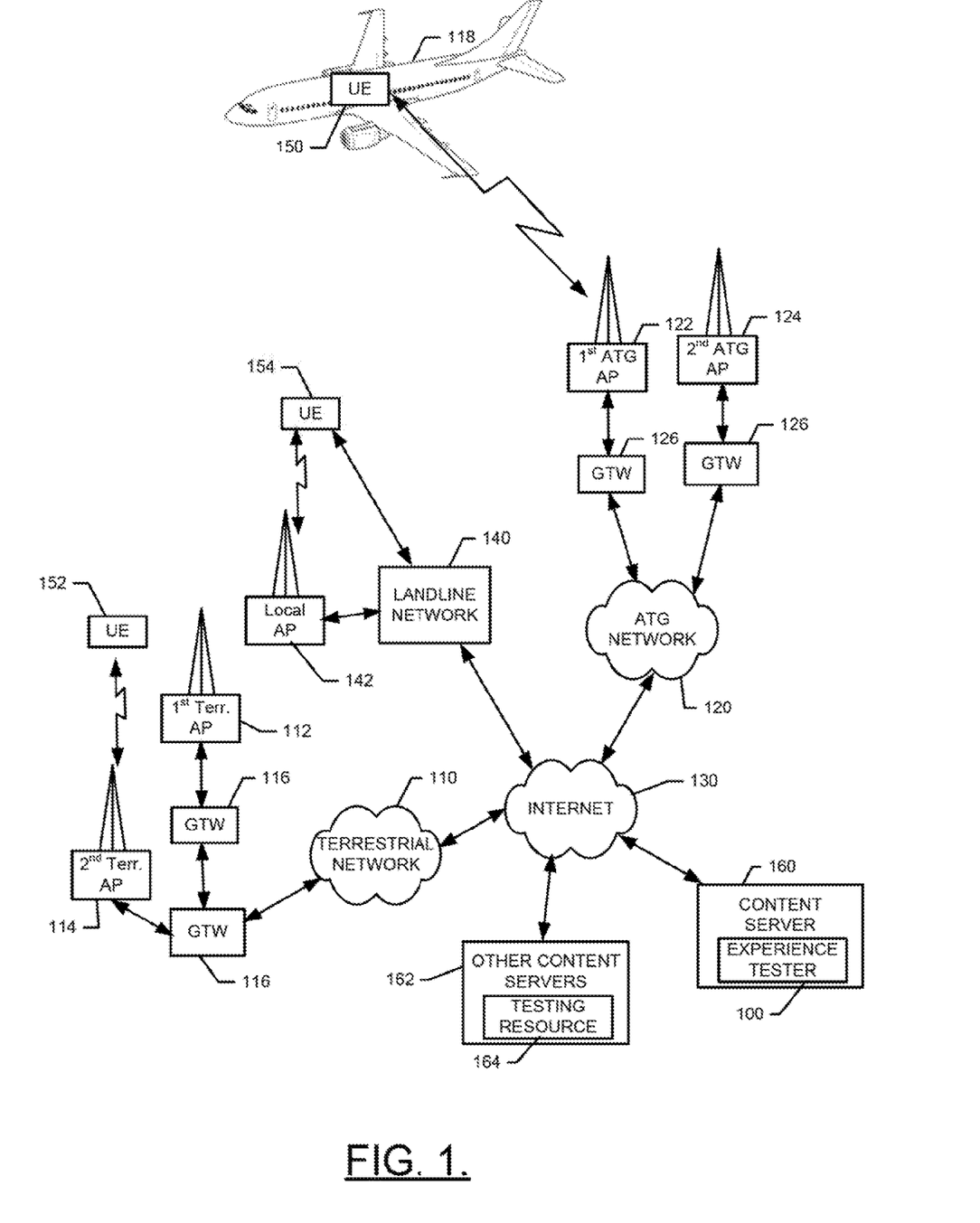
FIG. 1 illustrates a block diagram of a system for providing experience testing in accordance with an example embodiment.

FIG. 1 illustrates an example layout of a system in which multiple networks can be tested by a network test device or experience tester 100 of an example embodiment. As shown in FIG. 1, the experience tester 100 may operate in connection with a plurality of different types of networks including both wired networks and wireless networks. In this regard, examples of wireless networks shown in FIG. 1 include a terrestrial network 110 (e.g., a 4G, 5G, LTE or other such network) and an air-to-ground (ATG) network 120. However, it should be appreciated that other wireless communication networks, including satellite communication networks, may also be tested in accordance with example embodiments.

As shown in FIG. 1, each of the wireless networks may include wireless access points (APs) that include antennas configured for wireless communication. Thus, for example, the terrestrial network 110 may include a first terrestrial AP 112 and a second terrestrial AP 114, each of which may be base stations, among a plurality of geographically distributed base stations that combine to define the coverage area for the terrestrial network 110. The first and second terrestrial APs 112 and 114 may each be in communication with the terrestrial network 110 via a gateway (GTW) device 116. The terrestrial network 110 may further be in communication with a wide area network such as the Internet 130, Virtual Private Networks (VPNs) or other communication networks. In some embodiments, the terrestrial network 110 may include or otherwise be coupled to a packet-switched core or other telecommunications network.

The ATG network 120 may similarly include a first ATG AP 122 and a second ATG AP 124, each of which may be base stations, among a plurality of geographically distributed base stations that combine to define the coverage area for the ATG network 120. The first and second ATG APs 122 and 124 may each be in communication with the ATG network 120 via a GTW device 126. The ATG network 120 may also be in communication with a wide area network such as the Internet 130, VPNs or other communication networks. In some embodiments, the ATG network 120 may also include or otherwise be coupled to a packet-switched core or other telecommunications network.

Each access point of the terrestrial network 110 and the ATG network 120 may have a wired (or wireless) backhaul connection to its respective wireless network to allow access thereto for the wireless communications devices (e.g., user equipment (UE) 150 and UE 152) connected with the corresponding access points. Moreover, the access points can be provided via cellular towers or other tower structures (as in the depicted example), rooftops or other structures (e.g. building facades, church steeples, billboards, etc. . . . ) having wireless communication infrastructure, mobile vehicles and vessels, and/or the like. Furthermore, in existing wireless networks, it is to be appreciated that some cells defined by the access points may overlap or completely encompass one another, and/or coverage gaps may exist between some cells.

A landline network 140 is also shown in FIG. 1 as an example of a wired network, and is capable of being tested via example embodiments. The landline network may be an example of a local area network (LAN), a metropolitan area network (MAN), a wide area network (WAN) or any other network that can be operably coupled to the Internet 130 by electrical, optical or any other wired or cabled coupling means.

For UE 150, which is located on an aircraft 118, the UE 150 may be operably coupled to the APs of the ATG network 120 either directly or via an access point located on the aircraft 118. Meanwhile, UE 152 may be directly connected to the APs of the terrestrial network 110. Finally, UE 154 may be operably coupled to the landline network 140 either directly via a wired connection (e.g., Ethernet and/or the like), or indirectly via a local AP 142 that may use a short-range wireless communication protocol such as, for example, Bluetooth or WiFi. Of note, the UEs 150, 152 and 154 could each be examples of separate UEs used by corresponding separate users and devices (e.g., cell phones, lap top computers, tablets, desktop computers, etc.). Thus, each of the UEs shown, and possibly other UEs as well, can access the experience tester 100 simultaneously or in series.

As shown in FIG. 1, the experience tester 100 may be located at a content server 160 accessible from any of the access networks (e.g., the terrestrial network 110, the ATG network 120, the landline network 140, a satellite network, etc.) via the Internet 130. In this regard, any number of other content servers 162 may also be accessible via the Internet 130, and the UEs 150, 152, and 154 may be utilizing their respective access networks to access the services, applications, information, and/or the like that are located at various ones of the content servers 162 via the Internet 130. Moreover, in some cases, services or applications that may be available via the Internet 130 at various ones of the other content servers 162 may include one or more examples of a testing resource 164. Each instance of the testing resource 164 may be a unique network testing tool configured to test the speed, bandwidth, or various other aspects of network performance. The testing resource 164 may also or alternatively be configured to resolve various information about the access network that a given one of the UEs 150, 152, and 154 is currently using to access the Internet 130.

Accordingly, based on the structure described above, it should be appreciated that a user of any one of the UEs such as, for example, the UE 150, may be enabled to utilize its respective access network (e.g., the ATG network 120) to access the experience tester 100 via the Internet 130. As will be discussed in greater detail below, the experience tester 100 may be configured to call one or more instances of the testing resource 164, and potentially also implement local resources, to conduct information gathering and network testing information to provide a qualitative network assessment to the UE 150 regarding the ATG network 120. However, as can be appreciated from the descriptions above, a qualitative network assessment could be generated also or alternatively for each and every other access network via which a user reaches out to the experience tester 100 for assistance.

Figure 2:
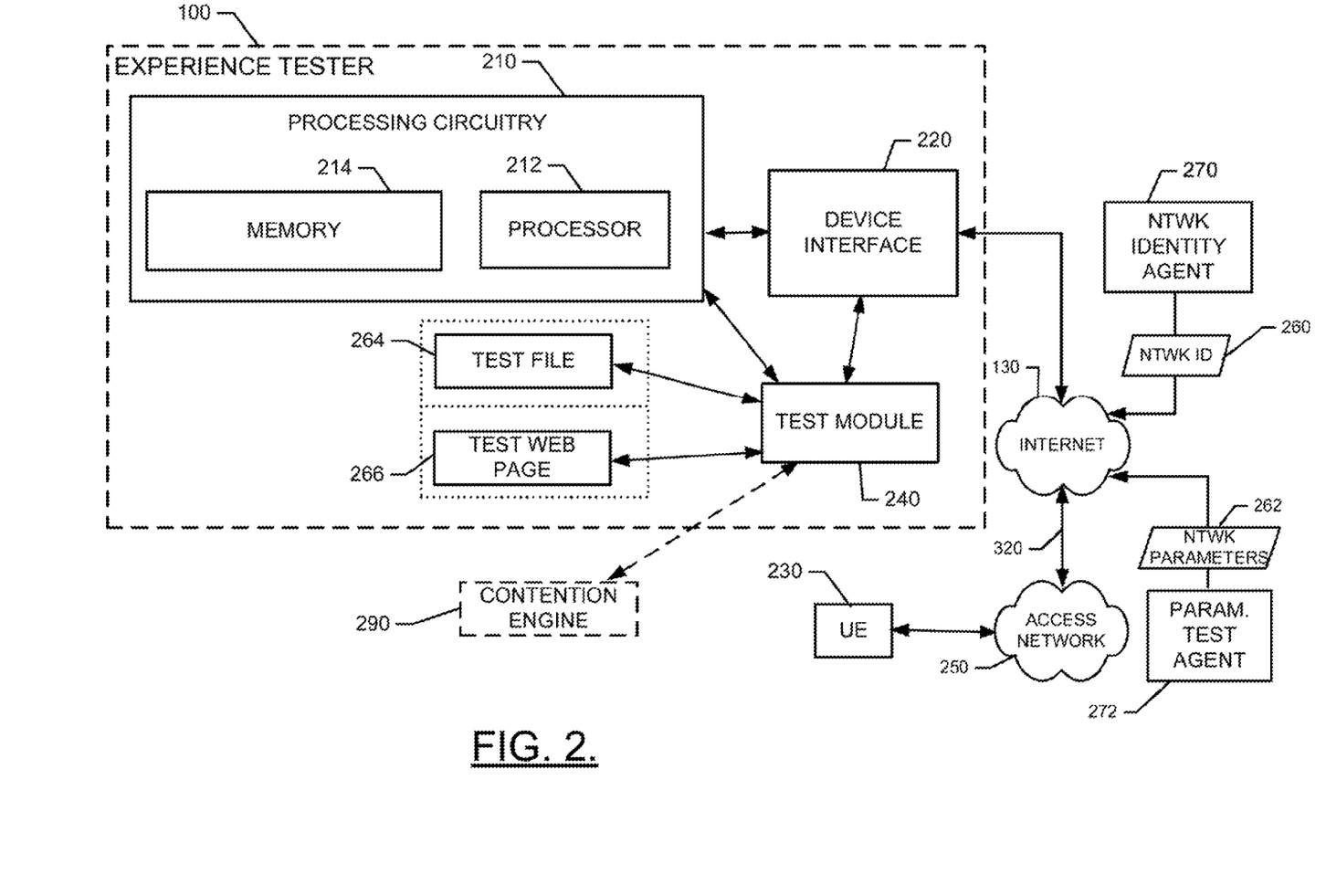
FIG. 2 illustrates a block diagram of an experience tester according to an example embodiment.

FIG. 2 illustrates a functional block diagram of the experience tester 100 of an example embodiment. In this regard, the experience tester 100 may include processing circuitry 210 configured to perform the tasks, operations and/or functions of the experience tester 100 as described herein. As such, the processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220. As such, the processing circuitry 210 may be embodied as a circuit chip (e.g., an integrated circuit chip) configured (e.g., with hardware, software or a combination of hardware and software) to perform operations described herein.

The experience tester 100 of FIG. 2 does not show a user interface. However, UE 230 of FIG. 2 (which is an example of any of the UEs of FIG. 1) may include the user interface. In this regard, the test module 240 of the experience tester 100 may interface with the browser of the UE 230 to generate control consoles, web pages and/or interface elements on the screen of the UE 230 to act as the user interface.

The device interface 220 may include one or more interface mechanisms for enabling communication with other devices, both internal and external to the experience tester 100. Thus, for example, internal modules or components and external modules, entities, web sites, devices and/or the like may all be communicated with via the device interface 220. In some cases, the device interface 220 may be any means such as a device or circuitry embodied in either hardware, or a combination of hardware and software that is configured to receive and/or transmit data from/to modules, entities, components, networks, web sites, applications, etc., that are in communication with the processing circuitry 210.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of the test module 240 based on inputs received by the processing circuitry 210 and/or entities, services or applications called to evaluate network performance of an access network 250 that is being evaluated by the experience tester 100. As such, in some embodiments, the processor 212 (or the processing circuitry 210) may be said to cause each of the operations described in connection with the test module 240 in relation to generation of requests for, and processing of responses including, information associated with the qualitative performance of the access network 250 responsive to execution of instructions or algorithms configuring the processor 212 (or processing circuitry 210) accordingly. In particular, the instructions may include instructions for obtaining either or both of network identification information 260 and network parameters 262 based on calls to assets accessible via the Internet 130. The network identification information 260 and network parameters 262 may then be useable by the test module 240 along with measurement of performance for download and upload of a test file 264 and a test web page 266 for providing the qualitative assessment of network performance as described herein.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input sensors and components. Among the contents of the memory 214, applications and/or instructions may be stored for execution by the processor 212 in order to carry out the functionality associated with each respective application/instruction. In some cases, the applications may include instructions for controlling operation of the text module 240 as described herein.

In an example embodiment, the UE 230 may access the Internet 130 via access network 250 (e.g., (e.g., the terrestrial network 110, the ATG network 120, the landline network 140, or a satellite network, etc.). The UE 230 may type in a web address associated with the experience tester 100 and a web page may be displayed that enables the user to test the performance of the access network 250 using the experience tester 100. In some embodiments, the user may initially launch operation of the experience tester 100 by requesting the experience tester 100 to detect the access network 250. The test module 240 may be configured to receive the request for network detection and initiate a call to a network identity agent 270. In this regard, for example, the test module 240 may use an application programming interface (API) for an entity (e.g., ipinfo.io) associated with the network identity agent 270 and that is capable of determining the network identification information 260. The network identification information 260 may include, for example, the user's public IP address, host name, city, region, country, and/or other data uniquely identifying the access network 250. The test module 240 may then be configured to, if possible, identify the connectivity solution associated with the access network 250 (e.g., the name of the network provider). If the name of the network provider can be determined, the test module 240 may log the name and all measurement data associated with conduct of the test along with the date, time and any other pertinent information (e.g., user location). The log may be provided in the memory 214, or in a separate memory location either at or accessible to the experience tester 100. If the name of the network provider cannot be determined, the test module 240 may request such information from the user. If the user provides a name of the network provider, again the log may record the name along with all measurement data. If no name can be determined, the log may record the name as unknown, or may record the measurement data in association with the remaining network identification information 260 obtained by the test module 240.

In some embodiments, particularly for ATG networks, satellite networks or similar services that can serve aircraft (e.g., aircraft 118), a separate request may be provided to the user by the test module 240 to request that the user indicate a tail number or flight number of the aircraft 118. In some cases, the tail number of the aircraft 118 may be associated with a particular network provider and/or other detailed information about the communications equipment associated with the aircraft 118 may be known. However, in other examples, the test module 240 may be able to automatically detect tail number information as well based on the network identification information 260, IP address, router MAC address or other means that may associate the network provider with an aircraft. Of note, in contexts not associated with aircraft, the tail number can be omitted completely.

After initial network detection and user entry of the name of the network provider and/or tail number information (if applicable), the user may select an option to continue the test. The test module 240 will then prepare to execute a battery of test activities, and commence execution of the battery of test activities when ready. In this regard, for example, the test module 240 may provide an indication that it is preparing to run the test to the user while making an API call to another test site (e.g., parameter test agent 272) in order to obtain ping test, jitter test and/or download speed information from another publicly available resource (e.g., another example of the testing resource 164). In a typical situation, the ping test, jitter test and/or download speed information obtained from the testing resource 164 would likely be the end of the test. For example, the test module 240 would display the results of the test (e.g., a ping test result, a jitter test result, and/or a download or upload speed result) as the network parameters 262 to the user as the final output of the test. However, as noted above, this information (i.e., the network parameters 262 in their raw form) is often either not conducive to interpretation in a meaningful way as to what the user experience will be, is not meaningful individually but rather in combination with the other parameters, or the information is simply not applicable to the particular service or application the user intends to employ (i.e. a slow return link may not be crucial to conducting one-way streaming services where the forward 'download' speed is more relevant, albeit streaming services may start slowly if latency is high). Accordingly, the test module 240 does not stop at this point, but continues to add other tests to the battery of test activities in order to get a more meaningful and useful result. In particular, the test module 240 may utilize still other testing resources 164 to get a more comprehensive result than simply employing the ping test, the jitter test, and/or the download and upload speed test.

In an example embodiment, the test module 240 may then be configured to download the test file 264 to the UE 230, and the download time may be measured and recorded. The test file 264 may be a file of a predetermined size (e.g., 1 MB) and may be at a predetermined location for the test module 240. In some cases, the test file 264 could be located with the test module 240 locally (e.g., at the memory 214). However, in other cases, it may be desirable to have the test file 264 stored at a remote location to further test the access network 250 in relation to accessing a file from another external server via the Internet 130. Thus, the test file 240 could be either locally or remotely stored with respect to the test module 240.

Thereafter, the same test file 264 may be uploaded from the UE 230 back to the experience tester 100 and the upload time may be measured and recorded. Thus, the test module 240 may have an accurate representation of the download and upload speeds for a known file that is standard across all network tests. The recordation of the times can not only identify situations where there is a significant imbalance between download and upload speeds, which could impact the user experience for services or applications that require fast speeds in both directions, but can also be used to compare either the same or different network performance results either at different times or with other distinguishing characteristics that may be determinable over time.

After the download and upload testing is completed, the test module 240 may be configured to direct the UE 230 to download a predetermined web page (i.e., the test web page 266) at a specified location. However, the test web page 266 may further include images that are located on different servers. In an example embodiment, the test web page 266 may have a predetermined size (e.g., 2 MB) and may have custom selected images that are on at least two different servers, and sometimes more than two servers (e.g., four servers). The requirement to access a known web page that includes images from multiple servers further tests the robustness of the capabilities of the access network 250 in a standard way, but not as monolithic as simply accessing a single web page with content found at a single server which is really abnormal in the context of how most webpages are constructed, pulling in components from a variety of different locations as various portions of the webpage are populated with content ranging from the desired information, analytics plug ins, advertising, and other links or services. Thus, the test web page 266 provides more meaningful testing of the user experience than conventional testing would, or could.

After downloading the test web page 266, the test module 240 may execute a social media download test with the UE 230. In this regard, since social media and certain other applications or services may require performance that involves more burst-type data exchanges, the test module 240 may direct the UE 230 to download a specific number of packets of a specific size and measure the download speed. For example, the experience tester 100 (i.e., via the test module 240) may direct the download and upload of eight 50 KB packets (for a total of 400 KB in each direction) while measuring and then recording download and upload speed of smaller amounts of data representative.

Accordingly, in some embodiments, the battery of tests described above may include any or all of a network identification information test, a network parameters test, a standard file download and upload test, a web page download test, and a social media download. Once all of the tests have been completed, the test module 240 may be configured to compute and generate results of the testing. The results of the testing may be generated by determining a score or rating for the performance of the access network 250 in relation to each of a plurality of different services or capabilities the user may expect the access network to deliver. In an example embodiment, the different capabilities or services may include voice calling, video calling, streaming entertainment, social media, gaming and web browsing. A total testing time (i.e., the total time for completion of all of the tests) may also be provided along with any other data that may be of interest to the user. For example, results of the ping test, the download speed, upload speed, website loading speed, and/or the like may be displayed. In some cases, an overall score may also be provided.

As such, the user may be presented with a summary of which functions the connection provided by the access network 250 supports, and to what degree. In other words, a qualitative assessment of network performance will be provided to the user in a way that relates network performance to specific media applications or services that are commonly used by various users. The user may therefore not just receive data that is not provided in any useful or meaningful context to the lay person. Instead, the user may receive meaningful results that are specifically presented in a way that is intuitive to understand, and that also reflects the way the user is likely to feel about the performance of the network when the network is used.

Although not required, some example embodiments may further include a contention engine 290. The contention engine 290 is shown in dashed lines in FIG. 2 in order to illustrate its optional nature. However, the contention engine 290 is also shown in dashed lines to indicate that its location within the system can be different in different embodiments. In this regard, the contention engine 290 could be accessed by the test module 240 via the Internet 130, or may be a local resource in some cases. Thus, although FIG. 2 shows a direct connection from the test module 240 to the contention engine 290, the connection may either be direct or indirect in various embodiments. Moreover, in some cases, the content engine 290 may be an online application or resource that can be called for input by the test module 240.

In any case, the contention engine 290 may be configured to determine resource contention (e.g., a contention ratio) for the access network 250 when requested by the test module 240. The contention engine 290 may be configured to sensor or otherwise determine the number of connected devices at a given access point. The command to sense or determine resource contention may occur automatically due to operation of the test module 240, or may be requested manually by the operator or initiated by changing settings of the test module 240 to add the determination of resource contention as part of the methods described herein. This method of resource contention determination may be conducted "internally."

However, in some cases, the contention engine 290 may be configured to determine resource contention "externally." External resource contention determination may be accomplished based on information or knowledge regarding network structure and the locations of various assets within the network structure. In this regard, for example, in cases where the access network 250 is the ATG network 120 or a satellite network, the information of knowledge of network structure may include information indicating specific beam coverage parameters. For example, databases may be provided to define satellite beamwidth and general geographic coverage areas for each satellite and each beam thereof at any given time. Similarly, ATG base station locations, the beams associated with each ATG base station, and the coverage areas of each beam may also be known or recorded. Aircraft location (or the location of other system assets) may then be compared to the known information about network structure in order to determine how many aircraft (or users on the aircraft) are sharing a beam at any given time. This can then be used to determine resource contention. Thus, external resource contention determination may fuse aircraft (or other asset) location/position information (e.g., from ADS-B or other sources), databases of which aircraft are equipped with in-flight connectivity equipment, databases of satellite or ATG beam inventory, information indicating which airlines have contracts with suppliers, and/or any other useful information in order to figure out how many aircraft (or assets) are being served by the same beam, satellite or tower at any given (current or future) time. The contention engine 290 may then report the resource contention information to the test module 240, and the test module 240 may determine a score for contention, and the impact of contention on the user experience.

As mentioned above, the test module 240 may be configured to generate a score or rating for network performance in relation to separate capabilities. The scoring may be accomplished based on actual experience of users. In this regard, for example, selected ones of the test battery results may be used for determining a score for individual ones of the capabilities that are rated. The selected results are those results that are pertinent, or most pertinent, to the corresponding capability. Thus, a selected test result from the battery of tests is only used in connection with determining the score for the respective capabilities with which the selected test result has relevance. Once a set of relevant test results is associated with each individual one of the capabilities, the boundaries between different rating levels are determined. Network testing was then performed by a group of testers and feedback from the testers is used to validate or modify the boundaries. For example, if the voice calling capability of a particular network was scored such that, based on predefined boundaries, the voice calling capability would receive a highly positive rating, the user feedback from the tester (or at least a predetermined number or percentage of testers) may either validate the predefined boundary or suggest that the predefined boundary should be adjusted to exclude the score received from getting the highly positive rating.

Figure 3A:
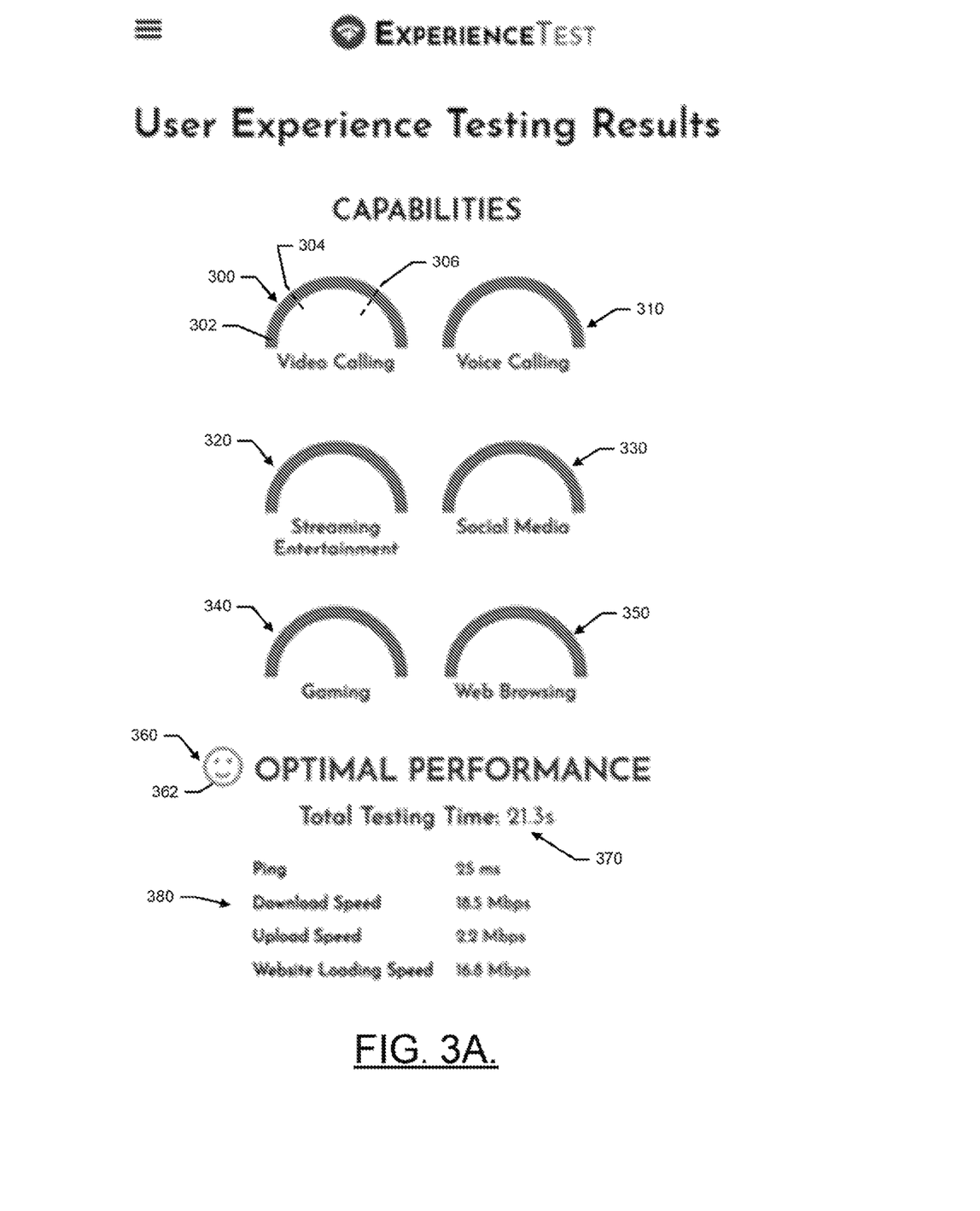
FIGS. 3A and 3B illustrate respective displays of results generated by the experience tester according to an example embodiment.
Figure 3B:
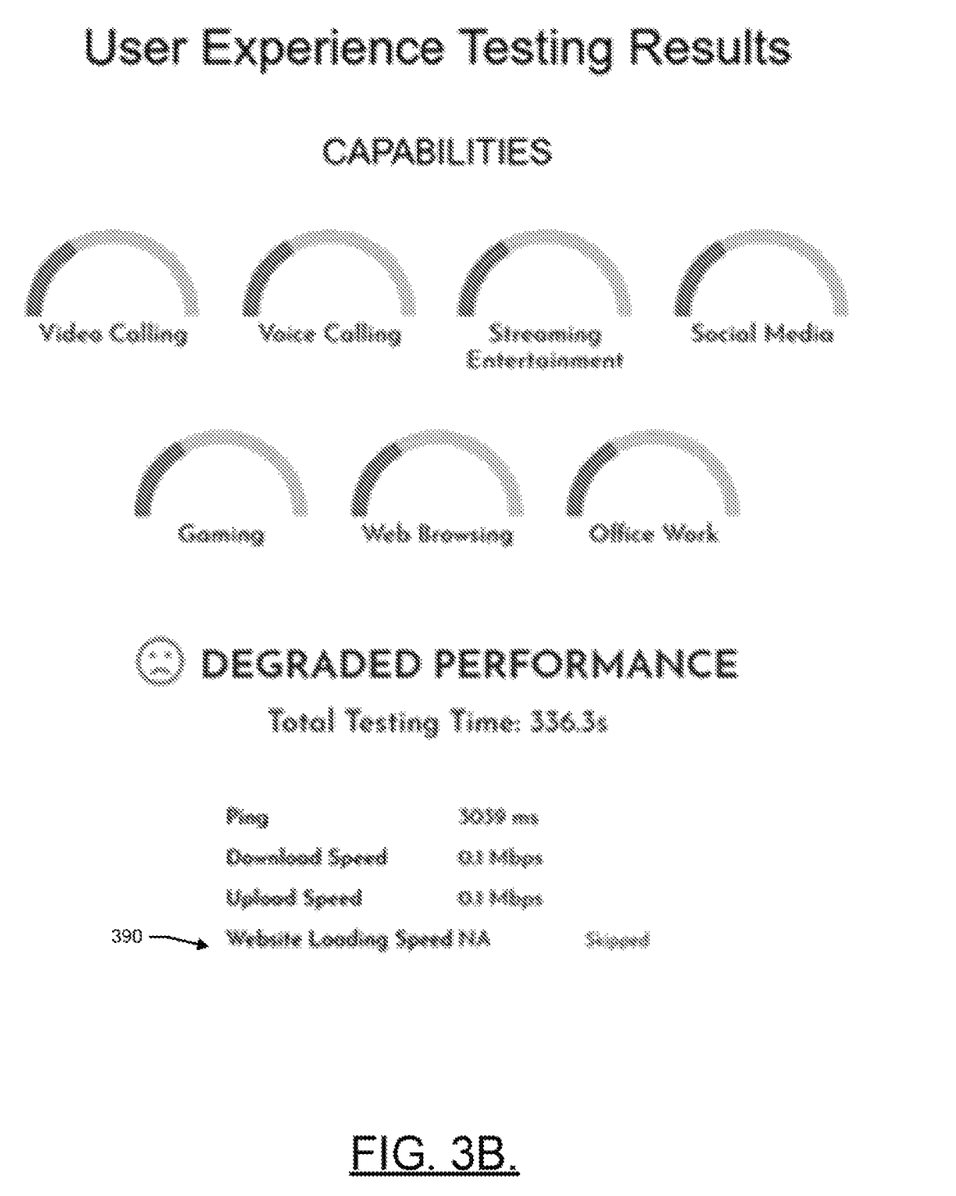

The scoring may result in ratings that are tied to an intuitive experience indicator such as, for example, an emoji (e.g., a smiley face, sad face, or the like). Another intuitive experience indicator may be a scale, bar graph or container that shows a degree of fullness to represent the rating or quality. Color (e.g., green, yellow or red) may also be implemented to provide an intuitive experience indicator. Moreover, combinations of the above listed intuitive experience indicators may be employed in some examples. FIGS. 3A and 3B each example results from operation of the experience tester 100. In this regard, FIG. 3A illustrates an example of a results page for testing of a particular access network that received a fully positive report. Meanwhile, FIG. 3B illustrates results from a legacy ATG network as of the filing of this application, and the results are poor in every category, particularly due to the lack of a quality return link and high latency.

Referring now to FIG. 3A, the results web page generated at the UE 230 are shown. As mentioned above, an intuitive experience indicator is provided for each of a plurality of capabilities of the access network 250. These indicators include a video calling indicator 300, a voice calling indicator 310, a streaming entertainment indicator 320, a social media indicator 330, a gaming indicator 340, and a web browsing indicator 350. As the name suggestions, the video calling indicator 300 provides a qualitative assessment of the capability of the access network 250 for conducting video calls. In this example, the intuitive experience indicator 302 associated with the video calling indicator 300 is a half circle shaped scale that provides a color coded and degree of fullness indication to the user regarding network capability. Thus, given that the scale is full and the color is green, the intuitive experience indicator 302 of this example indicates that the access network 250 will provide a good user experience to a user engaged in a video call. Of note, the scale may have regions indicated by boundaries 304 and 306. If the scale is full below boundary 304, a red color may be generated for the intuitive experience indicator 302. Meanwhile, if the scale is full at a level between boundary 304 and 306, a yellow color may be generated for the intuitive experience indicator 302. If the scale is full at a level above boundary 306, then a green color may be generated for the intuitive experience indicator 302. As such, the intuitive experience indicator 302 may, in some cases, be generated to include at least two intuitively determinable indications of experiential quality (e.g., color and scale fullness) to reinforce the qualitative nature of the result, and further distinguish the result from a mere number or numerical rating that has little or no significance to a lay person. In this regard, for example, the color may generally indicate the quality of experience (e.g., good, bad or average), and the scale fullness may provide an indication of numerical score, which is a further measure of the degree of the quality of experience.

Similarly, the voice calling indicator 310, the streaming entertainment indicator 320, the social media indicator 330, the gaming indicator 340, and the web browsing indicator 350 may each generate a colored and scaled output for an intuitive experience indicator. However, an overall performance indicator 360 may also be generated for the access network 250 by the test module 240. In this regard, the overall performance indicator 360 may also include an emoji 362 (which may further be color coded) and/or a verbal rating (e.g., "optimal performance," "poor performance," or "average performance").

In some example embodiments, a total testing time 370 may also be displayed. The total testing time 370 may provide an indication of the delays or latency associated with the access network 250, and thus, the total testing time 370 may be a useful indicator of quality in its own right. Other numerical results 380 may also be provided for the user to review. However, as noted above, these results are often not as useful to the lay person when they are not provided with some context. Thus, some embodiments may record these values, but present a rating for user viewing that instead utilizes an intuitive experience indicator for these values as well. FIG. 3B also illustrates one skipped test 390, which indicates that the experience tester 100 need not necessarily complete (or even attempt) every test. In this regard, in some cases, network performance may be so poor that certain tests cannot be completed within a predetermined time limit. If so, those tests may be skipped, and in some cases, other tests may also be skipped as a result of a prior skipped test due to anticipation that the subsequent test will not be completed if the prior test could not be completed.

As noted above, each separate category (or capability) has its own scoring formula that is based on the metrics or parameters captured during the execution of the battery of tests. As an example, for video calling a download speed of greater than 1.5 Mbps and an upload speed of greater than 1.5 Mbps along with latency (e.g., measured via the ping test) of less than 100 ms and a jitter of less than 100 ms may be treated as a positive result (e.g., green). Meanwhile, a download speed of greater than 0.7 Mbps (but less than 1.5 Mbps) and an upload speed of greater than 0.7 Mbps (but less than 1.5 Mbps) along with latency of between 100 ms and 250 ms and a jitter of between 100 ms and 500 ms may be treated as a moderate result (e.g., yellow). A poor result (e.g., red) may be a download speed of less than 0.7 Mbps and an upload speed of less than 0.7 Mbps along with latency of greater than 250 ms and a jitter of greater than 500 ms. Thus, the score for video calling may depend on download speed, upload speed, latency and jitter.

Scoring for voice calling may depend on the same metrics as video calling, but with slightly different thresholds since a good experience can be had without massive amounts of data being exchanged (voice data only, no video). For example, a positive (green) result may correlate to a download speed of greater than 0.128 Mbps and an upload speed of greater than 0.128 Mbps along with latency of less than 225 ms and a jitter of less than 100 ms. Meanwhile, a download speed of greater than 0.032 Mbps (but less than 0.128 Mbps) and an upload speed of greater than 0.032 Mbps (but less than 0.128 Mbps) along with latency of between 225 ms and 750 ms and a jitter of between 100,000 ms and 500 ms may be treated as a moderate result (e.g., yellow). A poor result (e.g., red) may be a download speed of less than 0.032 Mbps and an upload speed of less than 0.032 Mbps along with latency of greater than 750 ms and a jitter of greater than 500 ms.

Streaming entertainment is generally a one way (i.e., download direction only) activity, so a good experience will generally be dependent on the download capability, and not upload. Scoring for streaming entertainment may therefore not utilize an upload speed since the experience only depends on download speed. Accordingly, a positive (green) result for streaming entertainment may correlate to a download speed of greater than 3 Mbps along with a latency of less than 750 ms and a jitter of less than 750 ms. Meanwhile, a download speed of greater than 0.7 Mbps (but less than 3 Mbps) along with latency of between 750 ms and 1500 ms and a jitter of between 750 ms and 1500 ms may be treated as a moderate result (e.g., yellow). A poor result (e.g., red) may be a download speed of less than 0.7 Mbps along with latency of greater than 1500 ms and a jitter of greater than 1500 ms.

A good gaming experience may also require upload, and may require relatively high download and upload speeds with very low latency. Thus, scoring for gaming may be constructed such that a positive (green) result may correlate to a download speed of greater than 4 Mbps and an upload speed of greater than 1 Mbps along with latency of less than 100 ms and a jitter of less than 150 ms. Meanwhile, a download speed of greater than 1.5 Mbps (but less than 4 Mbps) and an upload speed of greater than 0.5 Mbps (but less than 1 Mbps) along with latency of between 100 ms and 250 ms and a jitter of between 150 ms and 250 ms may be treated as a moderate result (e.g., yellow). A poor result (e.g., red) may be a download speed of less than 1.5 Mbps and an upload speed of less than 0.5 Mbps along with latency of greater than 250 ms and a jitter of greater than 250 ms.

For a good experience while utilizing social media, both download and upload may be necessary. Thus, scoring for social media may be constructed such that a positive (green) result may correlate to a download speed of greater than 1.5 Mbps and an upload speed of greater than 1.5 Mbps along with latency of less than 150 ms and a jitter of less than 150 ms. Meanwhile, a download speed of greater than 0.5 Mbps (but less than 1.5 Mbps) and an upload speed of greater than 0.5 Mbps (but less than 1.5 Mbps) along with latency of between 150 ms and 1500 ms and a jitter of between 150 ms and 1500 ms may be treated as a moderate result (e.g., yellow). A poor result (e.g., red) may be a download speed of less than 0.5 Mbps and an upload speed of less than 0.5 Mbps along with latency of greater than 1500 ms and a jitter of greater than 1500 ms.

A good experience for web browsing may require both download and upload capabilities, but download speed may be the dominant requirement. Thus, scoring for web browsing may be arranged such that a positive (green) result may correlate to a download speed of greater than 3 Mbps and an upload speed of greater than 0.3 Mbps along with latency of less than 150 ms and a jitter of less than 150 ms. Meanwhile, a download speed of greater than 0.7 Mbps (but less than 3 Mbps) and an upload speed of greater than 0.15 Mbps (but less than 0.3 Mbps) along with latency of between 150 ms and 1500 ms and a jitter of between 150 ms and 1500 ms may be treated as a moderate result (e.g., yellow). A poor result (e.g., red) may be a download speed of less than 0.7 Mbps and an upload speed of less than 0.15 Mbps along with latency of greater than 1500 ms and a jitter of greater than 1500 ms.

As noted above, the test module 240 may record all of the scoring results in association with the network identification information 260. The scoring results may also include date and time information and, in some cases, location information for the UE 230. By storing past scoring results along with the network identification information 260, trend and/or historical data for a given access network, location, date/time, etc., can be generated by the test module 240. The trend or historical data can be provided to the user for comparison purposes (i.e., to see how performance today compares to average performance for the access network 250 at similar dates/times, for assets at similar locations, etc.) Thus, the user may sometimes be able to appreciate that the access network 250 is having a "good," "bad," or "average" day in terms of performance. Moreover, in some cases, users (or applications) can simply refer to historical data without actually running a new experience test in order to make determinations regarding their current or planned usage of the access network 250. Thus, for example, a user with multiple network options can review results for candidate networks (even prospectively and in advance of travel) to determine the likely best plan for optimizing connectivity during travel (either currently or in the future).

In some cases, users may utilize a particular web application or service whose performance depends at least in part (and sometimes to a large degree) on the corresponding performance of the access network 250 for the category (e.g., media type) of service or application being used. In these situations, it is possible for the web application or service to appear to be of poor design, quality or performance when the culprit making the web application or service look bad is actually the underlying access network. Accordingly, in addition (or as an alternative) to operating as described above in response to a UE 250 going to a website associated with the experience tester 100 and launching the battery of tests to consume the results by appreciating which categories of service (e.g., media types) will provide corresponding levels of quality in terms of user experience, the experience tester 100 could operate in other ways. For example, web services or applications may themselves initiate a call to the experience tester 100 in order to evaluate the access network 250 of a particular user attempting to use the web service or application.

In examples where the web service or application calls the experience tester 100, the battery of tests discussed above may be run without any specific user interaction. However, the experience tester 100 may provide an indication of network performance to the web service or application regarding the performance of the access network 250 associated with the particular user. The web service or application may do any of a number of things with this information. For example, in some cases, the web service or application may provide an unsolicited indication to the user to indicate the quality of the access network 250. This may be preemptive measure to let the user know the quality of their access network in order to set expectations for the user regarding the likely performance of the access network 250 and therefore potentially also the performance of the web service or application. In this regard, if the web service or application is a game, the gaming score may be provided by the test module 240 (with or without other scores), and the web service or application being launched by the user may proactively indicate that the user's network has been detected and the user experience for playing the game on this network will be a correspondingly rated level. For example, the game may provide an indication to the user that "your network has been detected and you can expect a [good or bad] experience based on your network's gaming capabilities." Using trend/historical data, the game could further provide suggestions regarding ways to improve performance or avoid poor performance such as, "please try a different network for optimal game performance," or "playing the game from hours xxxx to yyyy may result in degraded game performance on your network."

In some cases, web services or applications may further be configured to adjust service or performance characteristics based on the scoring results provided by the experience tester 100. For example, if the access network 250 grades highly (either for all categories, or at least for the category to which the web service or application belongs), the web service or application may automatically maximize certain parameters (e.g., video fidelity, image quality, or other settings). Meanwhile, if the access network 250 grades poorly (either for all categories, or at least for the category to which the web service or application belongs), the web service or application may automatically reduce or minimize certain parameters (e.g., video fidelity, image quality, or other settings). Accordingly, network capability-adaptive web services and/or applications may be provided that automatically adapt their performance to network performance based on the information provided by the experience tester 100. In some cases, the adaptation may be related to a mode of operation of the web service or application. For example, the web service or application may operate in a degraded mode, an offline mode, a normal mode, a fully optimized mode, and/or the like, based on the qualitative scoring of the access network 250, as determined by the experience tester 100.

Figure 4:
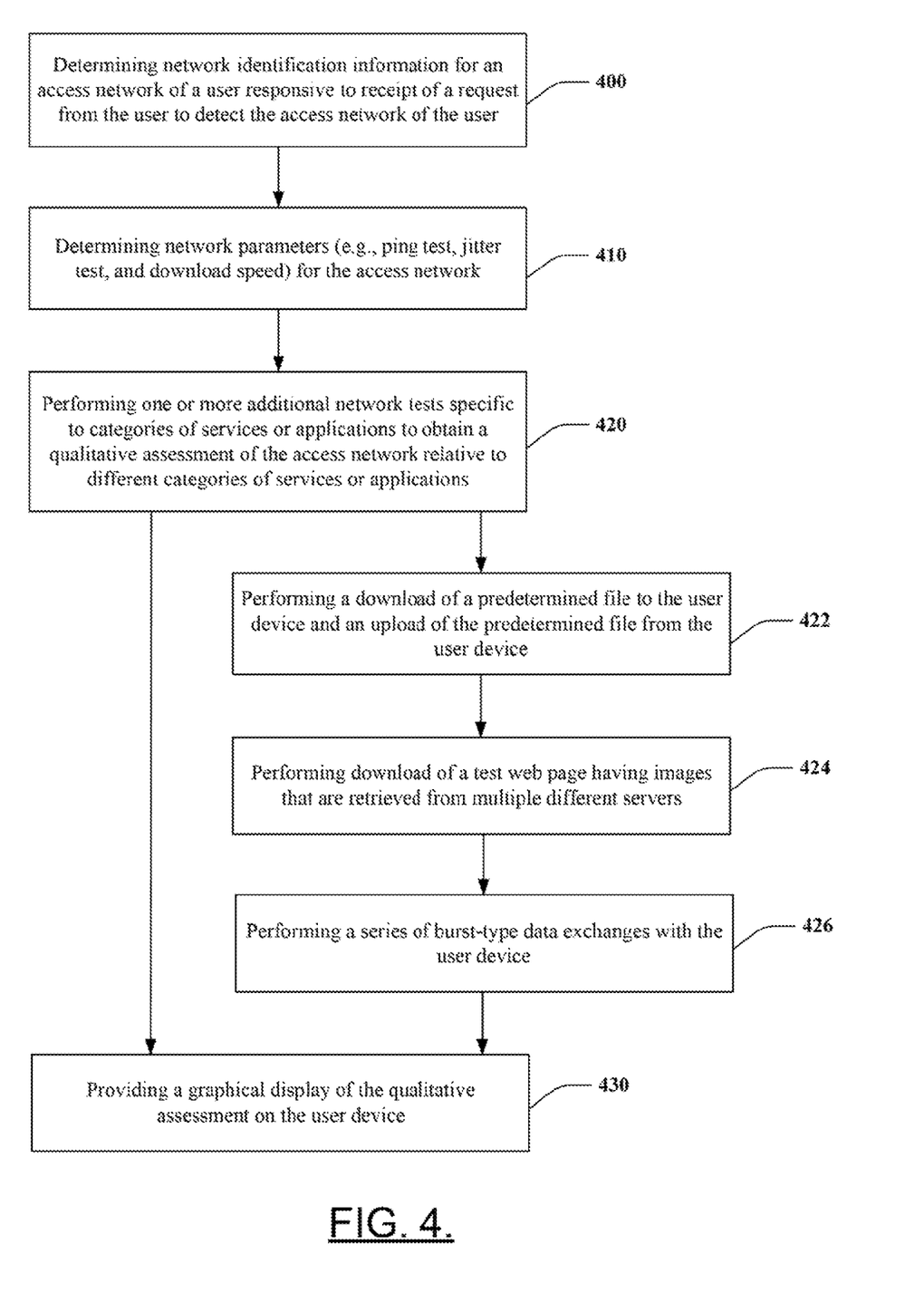
FIG. 4 illustrates a block diagram of a method of obtaining qualitative information regarding network capabilities according to an example embodiment.
Figure 5:
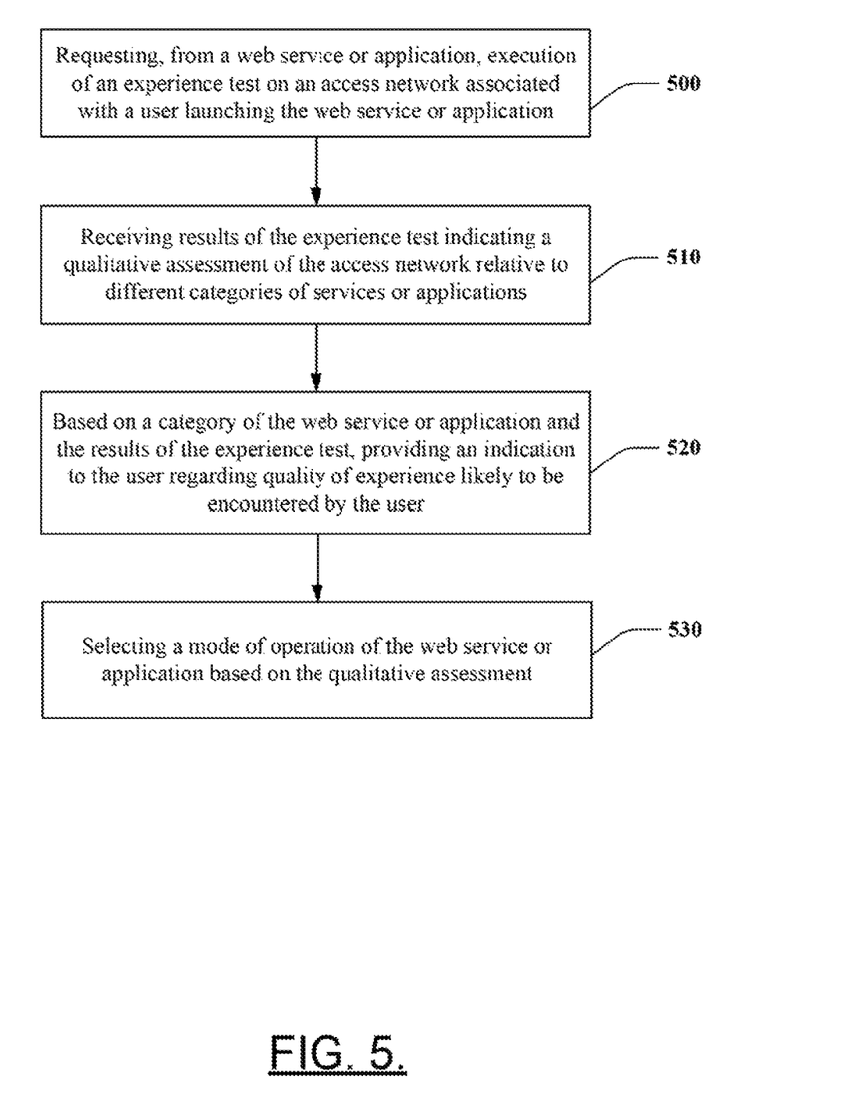
FIG. 5 illustrates a block diagram of a method of utilizing experience testing information for web service or application improvement according to an example embodiment.

As such, the system of FIG. 1 may provide an environment in which the test module 240 of FIG. 2 may provide a mechanism via which a number of useful methods may be practiced. FIGS. 4 and 5 each illustrate a block diagram of one method that may be associated with the system of FIG. 1 and the test module 240 of FIG. 2. From a technical perspective, the test module 240 described above may be used to support some or all of the operations described in FIG. 4, and the processing circuitry similar (at least in function, but perhaps not in form) to that of FIG. 2 at a device or server associated with execution of a web service or application employing the experience tester 100 may support some or all of the operations of FIG. 5. As such, the platform described in FIG. 2 may be used to facilitate the implementation of several computer program and/or network communication based interactions. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device (e.g., of the experience tester 100, the processing circuitry 210, or other processing circuitry) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include determining network identification information for an access network of a user responsive to receipt of a request from the user to detect the access network of the user at operation 400, determining network parameters (e.g., ping test, jitter test, and download speed) for the access network at operation 410, and performing one or more additional network tests specific to categories of services or applications to obtain a qualitative assessment of the access network relative to different categories of services or applications at operation 420. In some cases, operation 420 may include sub-steps or operations including performing a download of a predetermined file to the user device and an upload of the predetermined file from the user device at operation 422, performing download of a test web page having images that are retrieved from multiple different servers at operation 424, and performing a series of burst-type data exchanges with the user device at operation 426. In examples in which contention is also utilized, a resource contention determination (or score) may also be made via internal or external methods described above. The method may further include providing a graphical display of the qualitative assessment on the user device at operation 430.

In some embodiments, the method may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, determining network parameters may include calling an API to execute one or more of a ping test, jitter test, and download speed test. In an example embodiment, performing the one or more additional network tests may include performing a download of a predetermined file to the user device and an upload of the predetermined file from the user device. In some cases, the predetermined file may include a file of a fixed size, and wherein the fixed size comprises about one megabyte. In an example embodiment, performing the one or more additional network tests may include performing download of a test web page having images that are retrieved from multiple different servers. In some cases, performing the one or more additional network tests comprises performing a series of burst-type data exchanges with the user device. In an example embodiment, performing the one or more additional network tests may include each of performing a download of a predetermined file to the user device and an upload of the predetermined file from the user device, performing download of a test web page having images that are retrieved from multiple different servers, and performing a series of burst-type data exchanges with the user device. In some cases, providing the graphical display of the qualitative assessment may include generating an intuitive experience indicator based on a score associated with each respective one of the different categories of services or applications. In an example embodiment, the intuitive experience indicator may include at least two intuitively determinable indications of experiential quality. In some cases, one of the at least two intuitively determinable indications corresponds to a general quality of user experience and the other corresponds to a numerical value indicating a level of degree corresponding to the general quality of the user experience. In some cases, the method may further include providing a quantitative assessment of a combination of all tested parameters (e.g., the total time it takes to run all tests and obtain individual quantitative parameters that are used as the basis for the qualitative assessment. In such an example, providing the graphical display may include providing the graphical display to include both the qualitative assessment and the quantitative assessment (i.e., the total time). Moreover, in some cases, the quantitative assessment may be provided along with one or more of the individual tested parameters.

In another example method, shown in the block diagram of FIG. 5, the processing circuitry of a web service or application is generally the performer of the method. The method may include requesting, from a web service or application, execution of an experience test on an access network associated with a user launching the web service or application at operation 500, and receiving results of the experience test indicating a qualitative assessment of the access network relative to different categories of services or applications at operation 510. The method may further include providing, based on a category of the web service or application and the results of the experience test, an indication to the user regarding quality of experience likely to be encountered by the user at operation 520. Although not required, in some cases, the method may further include selecting a mode of operation of the web service or application based on the qualitative assessment at operation 630.

Accordingly, example embodiments employ an objective/quantitative series of tests and scores to then create a subjective/qualitative score or indication that is accurately representative of the user experience based on network capabilities. A beneficial aspect of employing example embodiments may be that by considering the tests in combination, rather than in isolation, the interdependency of otherwise qualitative variables actually provides valuable insight into the real user experience or application experience that simple numerical results do not provide. Traditional speed tests that simply show separate numbers can give a false sense of confidence in network quality, and these tests fail to teach or explain to the lay user what the numbers mean, and why a "good" number (i.e., a fast download speed) can still result in a poor experience (e.g., web pages loading slowly or email not sending), which can be to high latency, a slow upload speed, or both.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method comprising:
   determining network identification information for an access network of a user responsive to receipt of a request from a user device to detect the access network of the user;
   determining network parameters for the access network;
   performing one or more additional network tests specific to categories of services or applications to obtain a qualitative assessment of capabilities of the access network relative to different categories of services or applications; and
   providing a graphical display of the qualitative assessment on the user device.

2. The method of claim 1, wherein determining network parameters comprises calling an application programming interface (API) to execute one or more of a ping test, jitter test, and download speed test.

3. The method of claim 1, wherein performing the one or more additional network tests comprises performing a download of a predetermined file to the user device and an upload of the predetermined file from the user device.

4. The method of claim 3, wherein the predetermined file comprises a file of a fixed size, and wherein the fixed size comprises about one megabyte.

5. The method of claim 1, wherein performing the one or more additional network tests comprises performing download of a test web page having images that are retrieved from multiple different servers.

6. The method of claim 1, wherein performing the one or more additional network tests comprises performing a series of burst-type data exchanges with the user device.

7. The method of claim 1, wherein performing the one or more additional network tests comprises each of performing a download of a predetermined file to the user device and an upload of the predetermined file from the user device, performing download of a test web page having images that are retrieved from multiple different servers, and performing a series of burst-type data exchanges with the user device.

8. The method of claim 1, wherein providing the graphical display of the qualitative assessment comprises generating an intuitive experience indicator based on a score associated with each respective one of the different categories of services or applications.

9. The method of claim 8, wherein the intuitive experience indicator comprises at least two intuitively determinable indications of experiential quality.

10. The method of claim 9, wherein one of the at least two intuitively determinable indications corresponds to a general quality of user experience and the other corresponds to a numerical value indicating a level of degree corresponding to the general quality of the user experience.

11. The method of claim 1, further comprising providing a quantitative assessment of a combination of all tested parameters, wherein providing the graphical display comprises providing the graphical display to include both the qualitative assessment and the quantitative assessment.

12. An experience tester comprising a test module configured to:
   determine network identification information for an access network of a user responsive to receipt of a request from a user device to detect the access network of the user;
   determine network parameters for the access network;
   perform one or more additional network tests specific to categories of services or applications to obtain a qualitative assessment of the access network relative to different categories of services or applications; and
   provide a graphical display of the qualitative assessment on the user device.

13. The experience tester of claim 12, wherein the test module is configured to determine network parameters by calling an application programming interface (API) to execute one or more of a ping test, jitter test, and download speed test.

14. The experience tester of claim 12, wherein the test module is configured to perform the one or more additional network tests by performing a download of a predetermined file to the user device and an upload of the predetermined file from the user device.

15. The experience tester of claim 12, wherein the test module is configured to perform the one or more additional network tests by performing download of a test web page having images that are retrieved from multiple different servers.

16. The experience tester of claim 12, wherein the test module is configured to perform the one or more additional network tests by performing a series of burst-type data exchanges with the user device.

17. The experience tester of claim 12, wherein the test module is configured to perform the one or more additional network tests by performing each of a download of a predetermined file to the user device and an upload of the predetermined file from the user device, a download of a test web page having images that are retrieved from multiple different servers, and a series of burst-type data exchanges with the user device.

18. The experience tester of claim 12, wherein the test module is configured to provide the graphical display of the qualitative assessment by generating an intuitive experience indicator based on a score associated with each respective one of the different categories of services or applications.

19. The experience tester of claim 18, wherein the intuitive experience indicator comprises at least two intuitively determinable indications of experiential quality, and
   wherein one of the at least two intuitively determinable indications corresponds to a general quality of user experience and the other corresponds to a numerical value indicating a level of degree corresponding to the general quality of the user experience.

20. A method comprising:
   requesting, from a web service or application, execution of an experience test on an access network associated with a user launching the web service or application;
   receiving results of the experience test indicating a qualitative assessment of the access network relative to different categories of services or applications; and
   providing, based on a category of the web service or application and the results of the experience test, an indication to the user regarding quality of experience likely to be encountered by the user.

21. The method of claim 20, further comprising selecting a mode of operation of the web service or application based on the qualitative assessment.

* * * * *